US012587074B2

(12) United States Patent
Arnault et al.

(10) Patent No.: US 12,587,074 B2
(45) Date of Patent: Mar. 24, 2026

(54) GROUNDING BRUSH ASSEMBLY

(71) Applicant: AKTIEBOLAGET SKF, Gothenburg (SE)

(72) Inventors: Benoit Arnault, Saint-Cyr-sur-Loire (FR); Emmanuel Benevise, Monts (FR); Thomas Perrotin, Saint Roch (FR); Bruno Constant, Tours (FR)

(73) Assignee: AKTIEBOLAGET SKF, Gothenburg (SE)

( * ) Notice: Subject to any disclaimer, the term of this patent is extended or adjusted under 35 U.S.C. 154(b) by 207 days.

(21) Appl. No.: 18/398,290

(22) Filed: Dec. 28, 2023

(65) Prior Publication Data

US 2025/0219511 A1 Jul. 3, 2025

(30) Foreign Application Priority Data

Jan. 5, 2023 (FR) ...................................... 2300094

(51) Int. Cl.
*H02K 11/40* (2016.01)
*H01R 39/39* (2006.01)
(52) U.S. Cl.
CPC ............. *H02K 11/40* (2016.01); *H01R 39/39* (2013.01)
(58) Field of Classification Search
CPC .................................. H02K 11/40; H01R 39/39
See application file for complete search history.

(56) References Cited

U.S. PATENT DOCUMENTS

| | | | |
|---|---|---|---|
| 2021/0021180 A1 | 1/2021 | Hubert et al. | |
| 2021/0293279 A1* | 9/2021 | Hubert | F16C 33/586 |
| 2021/0364040 A1* | 11/2021 | Arnault | F16C 41/002 |
| 2022/0294319 A1 | 9/2022 | Arnault et al. | |

FOREIGN PATENT DOCUMENTS

| | | |
|---|---|---|
| FR | 3108452 A1 | 9/2021 |
| FR | 3120754 A1 | 9/2022 |

OTHER PUBLICATIONS

Preliminary Search Report from the French Patent Office dated Jun. 22, 2023 in related French application No. FR2300094, including Search Report and Written Opinion.

* cited by examiner

*Primary Examiner* — Viet P Nguyen
(74) *Attorney, Agent, or Firm* — J-TEK LAW PLLC; Scott T. Wakeman; Mark A. Ussai

(57) ABSTRACT

A grounding brush assembly includes a grounding brush and a brush mounting plate, the brush being provided with a plurality of conductive fibers and a support in which the conductive fibers are housed. The mounting plate is secured to the support and includes a radial portion extending radially outwardly with respect to the support and an axial portion extending axially from the radial portion so as to be spaced radially outwardly from and at least partly radially surrounding the support. The mounting plate also includes at least one collar extending radially outwardly from the distal end of the axial portion.

9 Claims, 15 Drawing Sheets

GROUNDING BRUSH ASSEMBLY

CROSS-REFERENCE

This application claims priority to French patent application no. 2300094 filed on Jan. 5, 2023, the entire contents of which are fully incorporated herein by reference.

BACKGROUND OF THE INVENTION

The present invention relates to the field of grounding devices for controlling currents generated in the shafts of electric motors or machines, and in particular to grounding brush assemblies.

In an electric motor or machine, at least one rolling bearing is mounted between the casing of the motor, or other electric machine, and a rotary shaft in order to rotatably support the shaft. During machine operation in which the shaft is rotating, an electrical potential difference can arise between the shaft and the casing of the electric motor or machine. Such an electrical potential difference may generate an electric current between the inner ring of the rolling bearing, which is secured to the rotary shaft, and the outer ring secured to the casing or housing.

An electric current that passes through the components of the rolling bearing can damage these components, in particular the rolling elements and the raceways formed on the inner and outer rings. Also, electrical discharges can generate vibrations.

To remedy these drawbacks, it is a known practice to "earth" or ground the rotary shaft by using a grounding brush or sliding contact that comprises conductive fibers. The grounding brush is generally mounted within the bore of the casing of the electric motor, such that the free ends of the fibers are in radial contact with the outer surface of the rotary shaft.

Due to the conductivity of these fibers, the brush is maintained at the same electrical potential as the casing of the electric motor. The inner and outer rings of the rolling bearing are also at the same electrical potential, which reduces and preferably eliminates, the problematic electrical discharges through the rolling bearing.

US Patent Publication No. 2021/0021180A1 discloses a grounding brush assembly comprising a grounding brush provided with a support and a plurality of conductive fibers mounted in the support, and an annular mounting plate provided with a plurality of tongues for radial and axial retention of the support of the grounding brush and an annular outer flange radially surrounding the brush and the tongues. The tongues are formed by plastic deformation of the mounting plate. As such a grounding brush assembly is typically force-fitted into the bore of the casing, the grounding brush assembly may therefore be difficult to dismantle and/or demount.

SUMMARY OF THE INVENTION

The present invention aims to remedy the drawback noted above and relates to a grounding brush assembly comprising a grounding brush and a brush mounting plate, the brush being provided with a plurality of conductive fibers and a support in which the conductive fibers are housed.

The mounting plate is secured to the support and is provided with a radial portion extending radially outwards with respect to the support, and an axial portion axially extending from the radial portion and at least partly radially surrounding the support, specifically being spaced radially apart from the support.

According to a general feature of the invention, the mounting plate comprises at least one collar extending the distal end of the axial portion radially outwards. The axial portion of the mounting plate may be annular.

In one embodiment, the collar of the mounting plate can be annular. Alternatively, the mounting plate may include a plurality of collars spaced circumferentially apart from each other.

The mounting plate may include at least one attachment lug extending axially from the axial portion and provided at a distal end with a hook extending radially, the hook being capable of being offset axially with respect to the collar on the side opposite the radial portion.

The attachment lug of the mounting plate may include two opposing rims each extending from the hook of the attachment lug and each being connected to a directly adjacent collar of the plurality of collars.

A circumferential play may remain between the attachment lug of the mounting plate and each directly adjacent collar of the plurality of collars.

The invention also relates to an electric machine or motor comprising a casing, a shaft, a grounding brush assembly as described above and mounted at least partly radially between the casing and the shaft, the conductive fibers of the assembly being in contact with the shaft.

An axial play may remain between the casing and the collar of the mounting plate.

The mounting plate may include a plurality of radial portions spaced circumferentially apart from each other, with an amount of axial play remaining between the casing and the radial portions. Also, an axial play may remain between the casing and the hooks.

BRIEF DESCRIPTION OF THE SEVERAL VIEWS OF THE DRAWINGS

The present invention will be better understood on studying the detailed description of embodiments, taken as non-limiting examples and illustrated by the attached drawings in which.

DETAILED DESCRIPTION OF THE INVENTION

Figure 1:
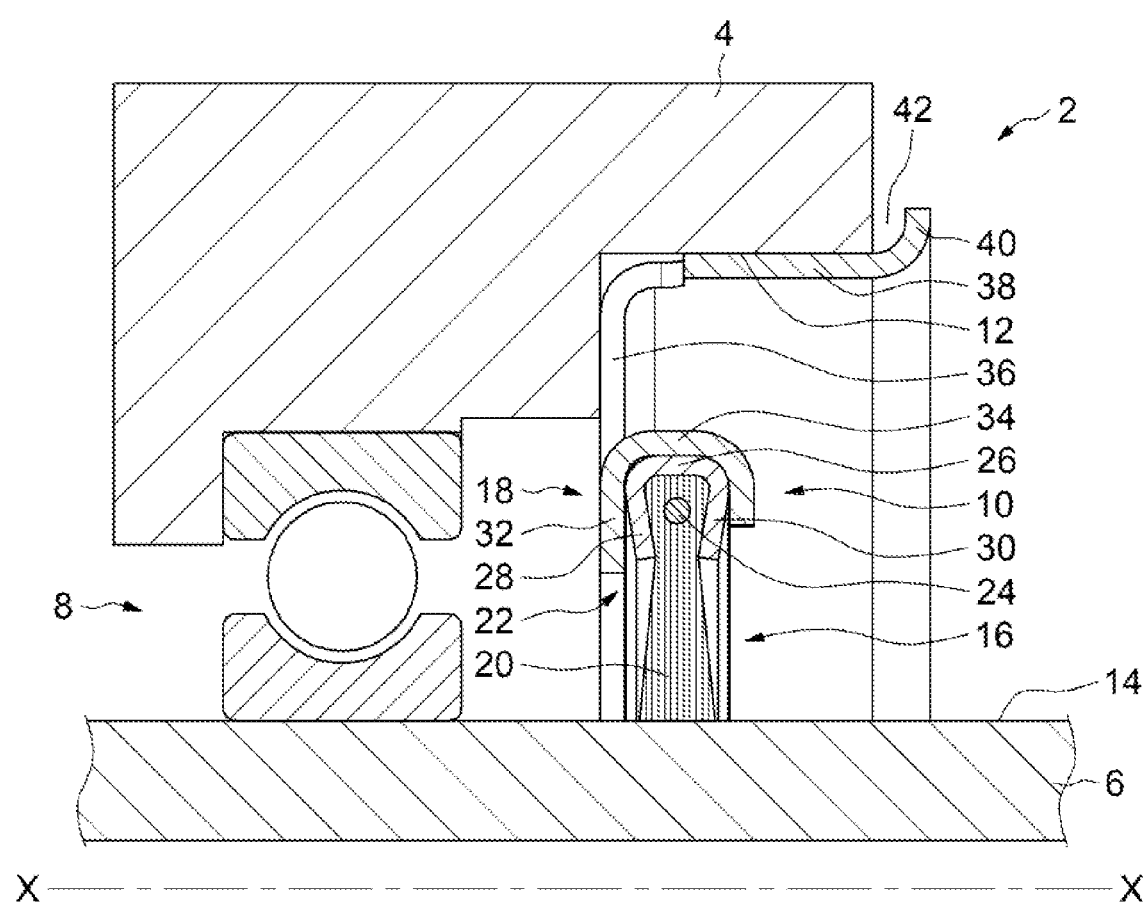
FIG. 1 is an axial cross-sectional view of a grounding brush assembly mounted partly radially between a rotary shaft and an electric motor casing according to a first exemplary embodiment of the invention.
Figure 2:
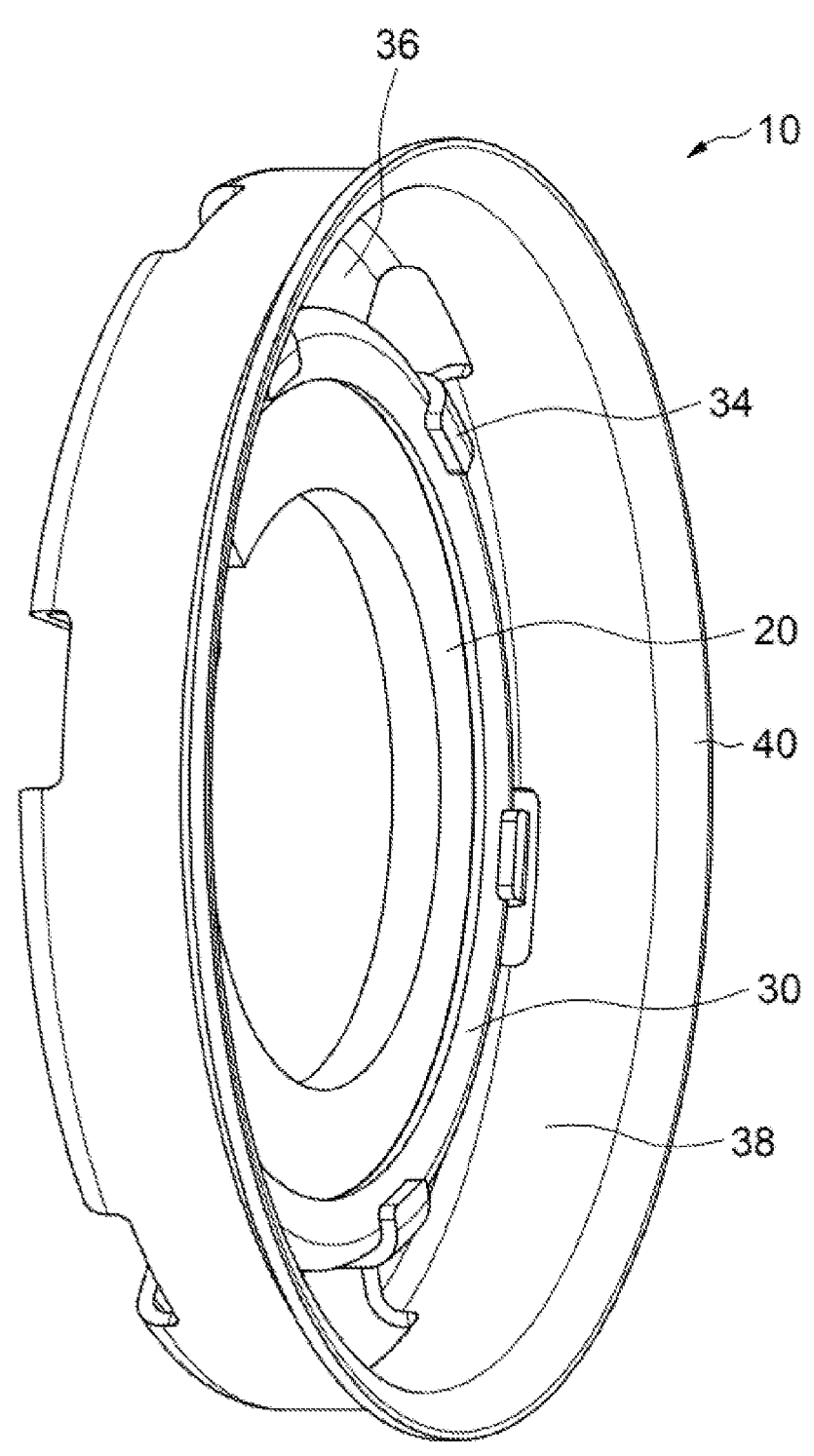
FIG. 2 is a perspective view of the grounding brush assembly of FIG. 1.
Figure 3:
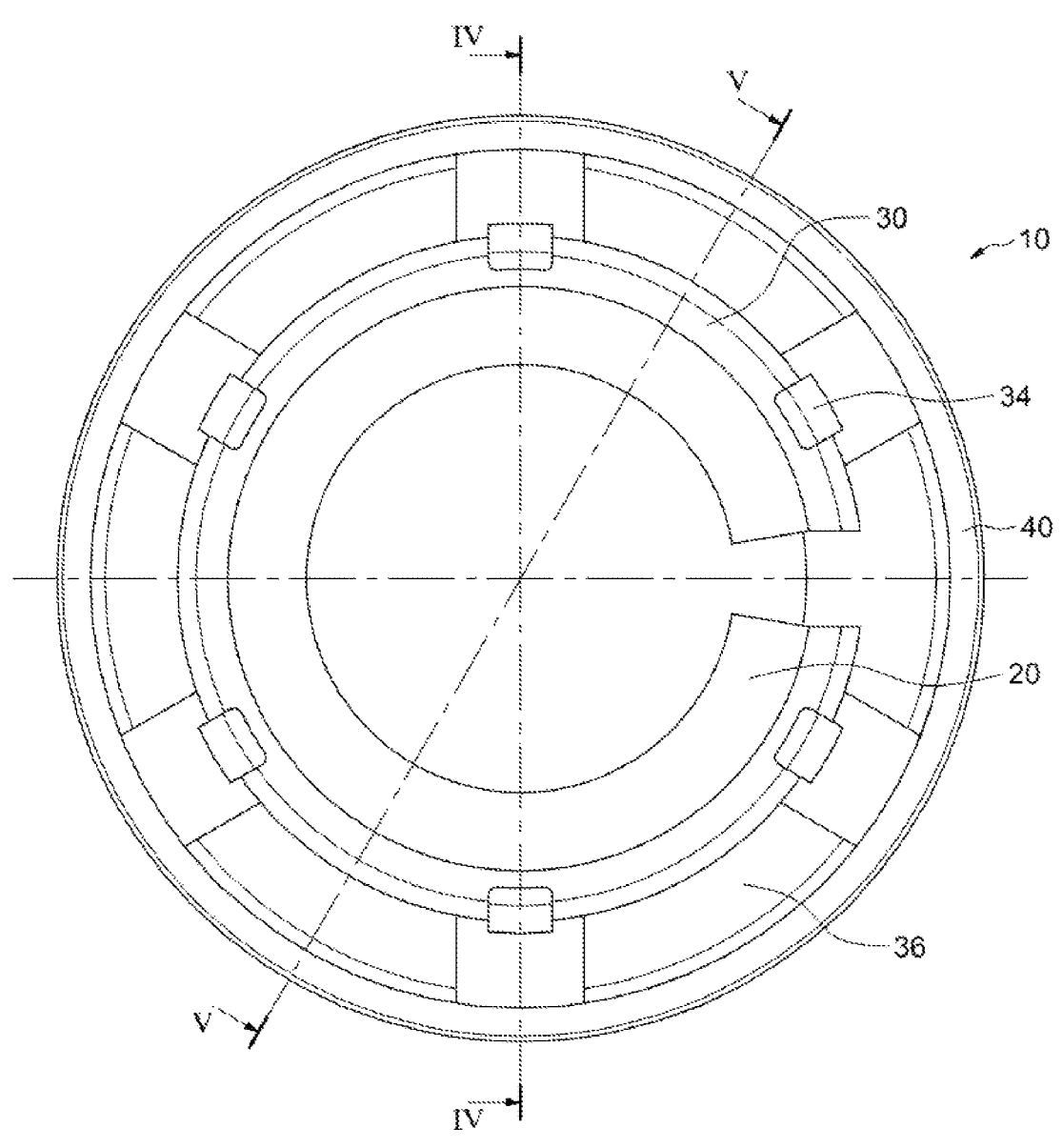
FIG. 3 is a front view of the grounding brush assembly of FIG. 1.
Figure 4:
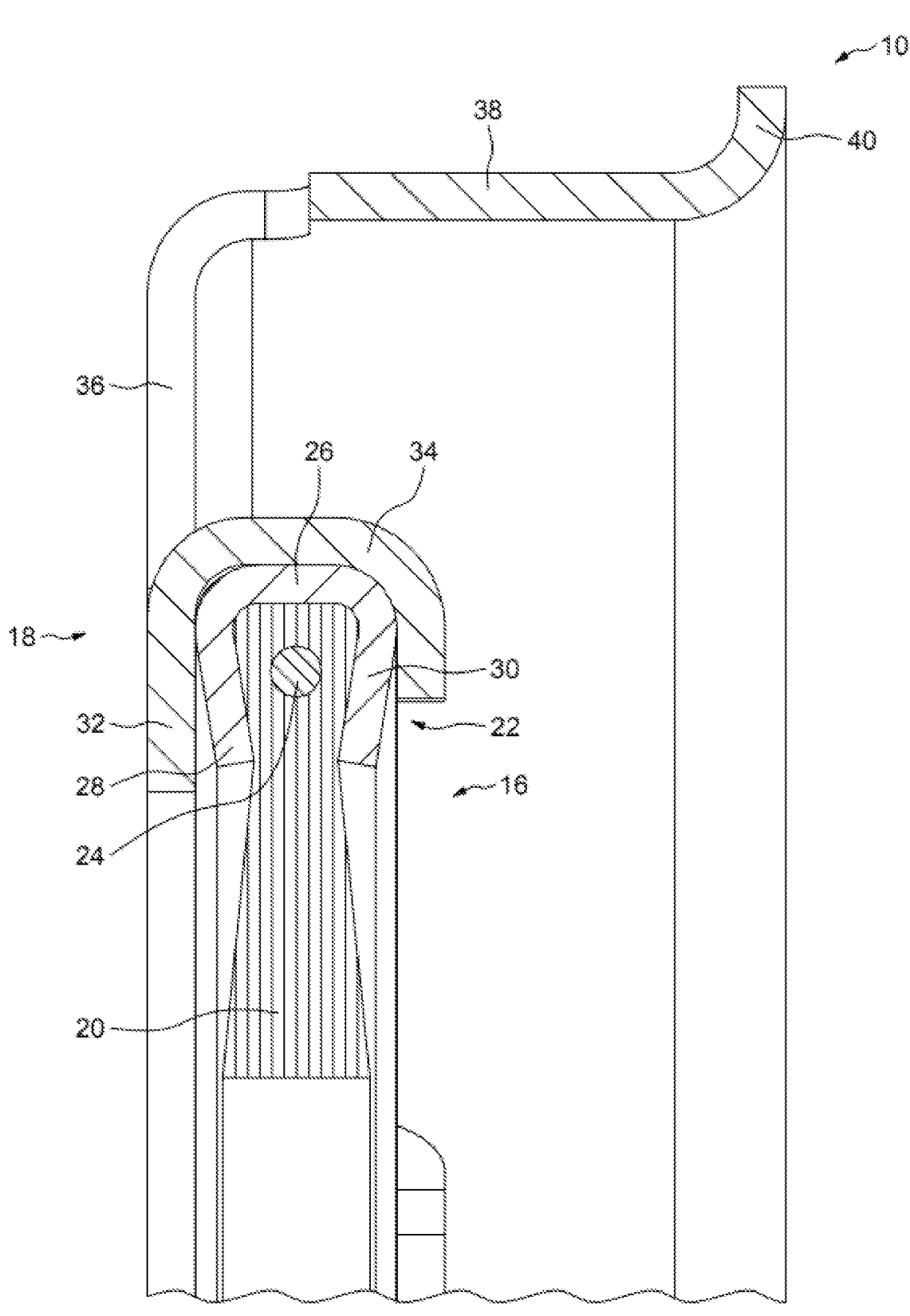
FIG. 4 is a cross-sectional view of the assembly of FIG. 3 along the axis IV-IV.
Figure 5:
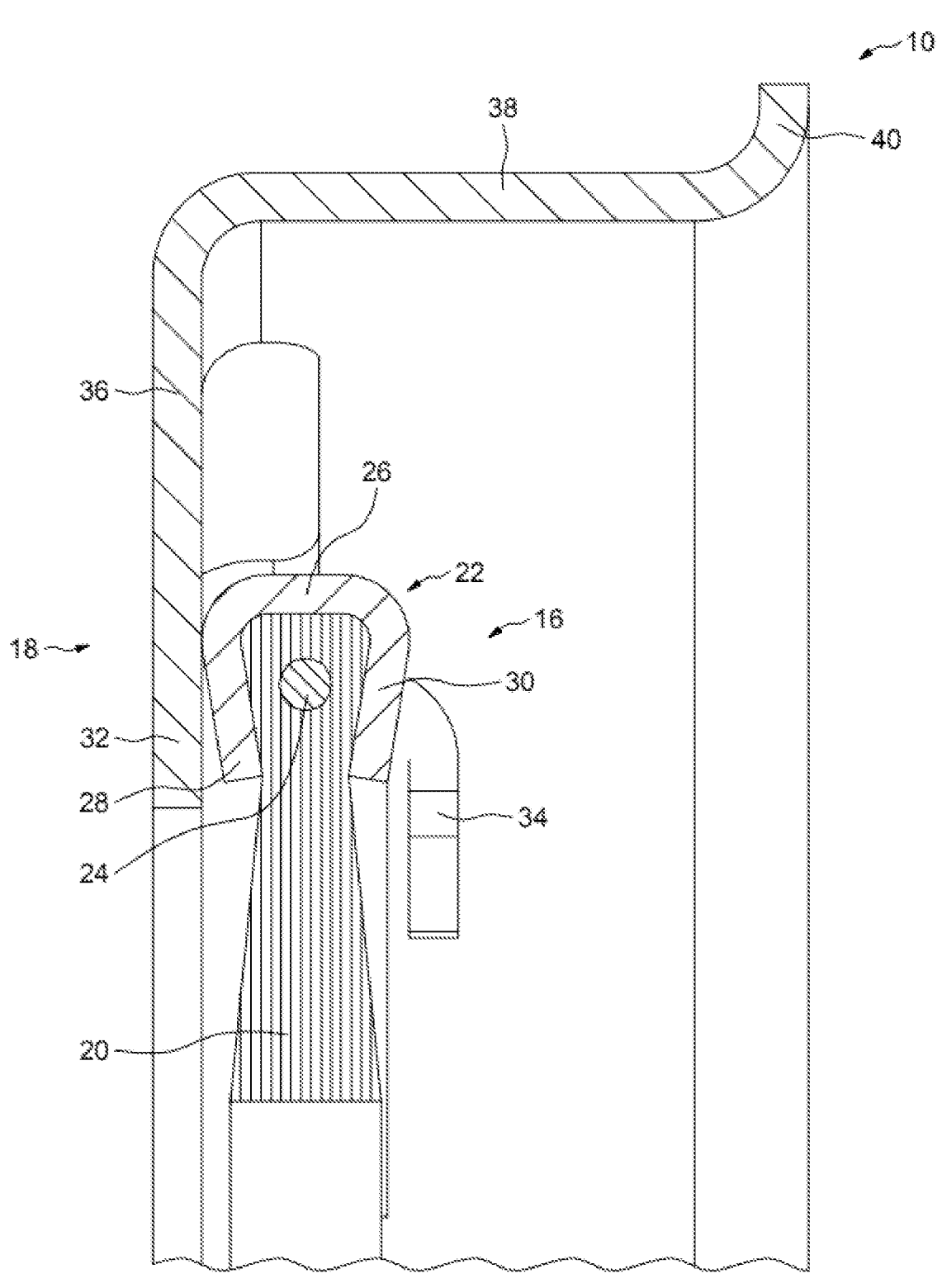
FIG. 5 is a cross-sectional view of the assembly of FIG. 3 along the axis V-V.

FIG. 1 depicts, in axial cross-section, a part of an electric motor or machine 2 comprising a fixed casing 4 and a rotary shaft 6 having an axis of rotation X-X and supported radially by a bearing 8. The bearing 8 may be, for example, a ball bearing as depicted, but may alternatively be provided with any other type(s) of rolling elements, for example cylindrical rollers, tapered rollers, needles, etc. In another variant, the bearing 8 may be a plain bearing.

The motor or other machine 2 further comprises a grounding brush assembly 10 mounted partly radially between the bore 12 of the casing 4 and the outer cylindrical surface 14 of the shaft 6. The grounding brush assembly 10 may be, for example, force-fitted into the bore 12 of the casing 4.

As illustrated more clearly in FIGS. 2-5, the grounding brush assembly 10 has a generally annular form. The assembly 10 basically comprises a grounding brush 16 and a brush mounting plate 18.

The grounding brush 16 includes a plurality of conductive fibers 20 and a support 22, the conductive fibers 20 being housed inside the support 22 of the brush 16. The conductive fibers 20 may be formed of, for example, carbon, stainless steel, a conductive plastic such as acrylic fibers or nylon, etc. The plurality of conductive fibers 20 are preferably formed as an open ring. In the illustrated example, the conductive fibers 20 are folded around a link wire 24. The free distal or inner end of each conductive fiber 20 is intended to come into radial contact with the outer surface 14 of the shaft 6.

To ensure the mounting and the retaining of the conductive fibers 20, the support 22 preferably includes a mounting portion 26, a first lateral rim 28 extending from one side of the mounting portion 26 and a second lateral rim 30 extending from another side of the mounting portion 26.

The mounting plate 18 is secured to the support 22. The mounting plate 18 includes a main body 32 bearing axially against the first rim 28 of the support 22, a plurality of tongues 34 for axial and radial retention of the brush 16, and a plurality of radial portions 36.

The radial portions 36 of the mounting plate 18 extend radially outwardly from the main body 32 of the mounting plate 18 and are spaced circumferentially apart from each other. Alternatively, the mounting plate 18 may include a single annular radial portion 36.

The retaining tongues 34 extend from the main body 32 of the mounting plate 18 and are spaced circumferentially apart from each other, each retaining tongue 34 being situated or disposed circumferentially between two successive radial portions 36 of the mounting plate 18. Each retaining tongue 34 extends from the main body 32 of the mounting plate 18 such that the retaining tongue 34 locally radially surrounds the support 22 of the brush 16 by being in both radial contact and axial contact with the support 22. The support 22 is thus held axially and radially by the retaining tongues 34.

In the present example, the mounting plate 18 comprises six radial portions 36 and six retaining tongues 34 spaced circumferentially apart regularly or evenly. Alternatively, the mounting plate 18 may include a different number of radial portions 36 (e.g., four) and a different number of retaining tongues 34.

The mounting portion 26 of the support 22 is in radial contact against the retaining tongues 34 and the second lateral rim 30 is in axial contact against the tongues 34. The mounting portion 26 extends from the large-diameter edge of the first lateral rim 28, preferably in a generally axial direction. However, the mounting portion 26 may alternatively extend obliquely.

The second lateral rim 30 of the support 22 extends radially towards the interior of the mounting portion 26. The second lateral rim 30 extends from the mounting portion 26 on the axial side opposite to the first lateral rim 28. The mounting portion 26 and the first and second lateral rims 28, 30 are of annular form and delimit a channel that is open radially on the internal side, inside which an end of the conductive fibers 20 is situated or disposed. Preferably, the first and second lateral rims 28, 30 axially grip the conductive fibers 20. The conductive fibers 20 axially bear on either side against the first and second lateral rims 28, 30.

In the illustrated exemplary embodiment, the conductive fibers 20 radially bear against the mounting portion 26 and the first and second lateral rims 28, 30 extend obliquely inwardly from the mounting portion 26. Alternatively, the first and second lateral rims 28, 30 may extend entirely or substantially radially from the mounting portion 26.

In the depicted exemplary embodiment, the mounting plate 18 and the support 22 are two distinct parts. Alternatively, the mounting plate 18 and the support 22 may be integrally formed or produced together as a single piece, for example formed by cutting and stamping. In such a case, the main body 32 of the mounting plate 18 preferably extends from the small-diameter edge (i.e., the inner diameter edge) of the first lateral rim 28.

The mounting plate 18 and the grounding brush 16 are each formed of an electrically conductive material, such as for example, aluminum, stainless steel, bronze, copper or other appropriate material or combination of materials.

The mounting plate 18 also includes an annular axial portion 38 extending axially from the large-diameter edge of the radial portions 36 of the mounting plate 18. The axial portion 38 radially surrounds and is spaced radially outwardly from the mounting portion 26 of the support 22. As depicted, the axial portion 38 extends purely or entirely axially, but may alternatively extend both axially and radially, i.e. obliquely, inwardly or outwardly.

In a variant, the mounting plate 18 may include, instead of the single annular axial portion, a plurality of axial portions 38 spaced circumferentially apart from each other.

The mounting plate 18 further includes an annular collar 40 extending radially outwardly from the distal end of the annular axial portion 38 of the mounting plate 18, i.e., the end distal from the radial portions 36. The proximal end of the axial portion 38 is connected to the radial portions 36.

In the depicted example, the collar 40 has a curved connecting portion extending from the axial portion 38 and a radial portion extending radially outwardly from the connecting portion. Alternatively, the collar 40 may extend purely or entirely radially from the axial portion 38. In another variant, the collar 40 may extend radially inwardly from the distal end of the annular axial portion 38 of the mounting plate 18.

Referring again to FIG. 1, the grounding brush assembly 10 is mounted partly radially between the bore 12 of the casing 4 and the outer cylindrical surface 14 of the shaft 6 such that the plurality of radial portions 36 of the mounting plate 18 bear axially against a shoulder of the casing 4. The axial portion 38 of the mounting plate 18 bears radially outwardly against the bore 12 of the casing 4 and extends axially so as to protrude outwardly from the casing 4. As such, the annular collar 40 of the mounting plate 18 of the assembly 10 is spaced apart axially from the casing 4 so that an axial play 42 remains between the casing 4 and the annular collar 40 of the mounting plate 18 of the assembly 10. That is, an axial play or clearance 42 is defined between the casing 4 and the annular collar 40 of the mounting plate 18. The axial play/clearance 42 enables the insertion of a tool (not depicted) to enable the assembly 10 to be dismantled easily, the tool making it possible to pull axially on the annular collar 40 of the mounting plate 18 by exerting a force on the side opposite the casing 4.

Figure 6:
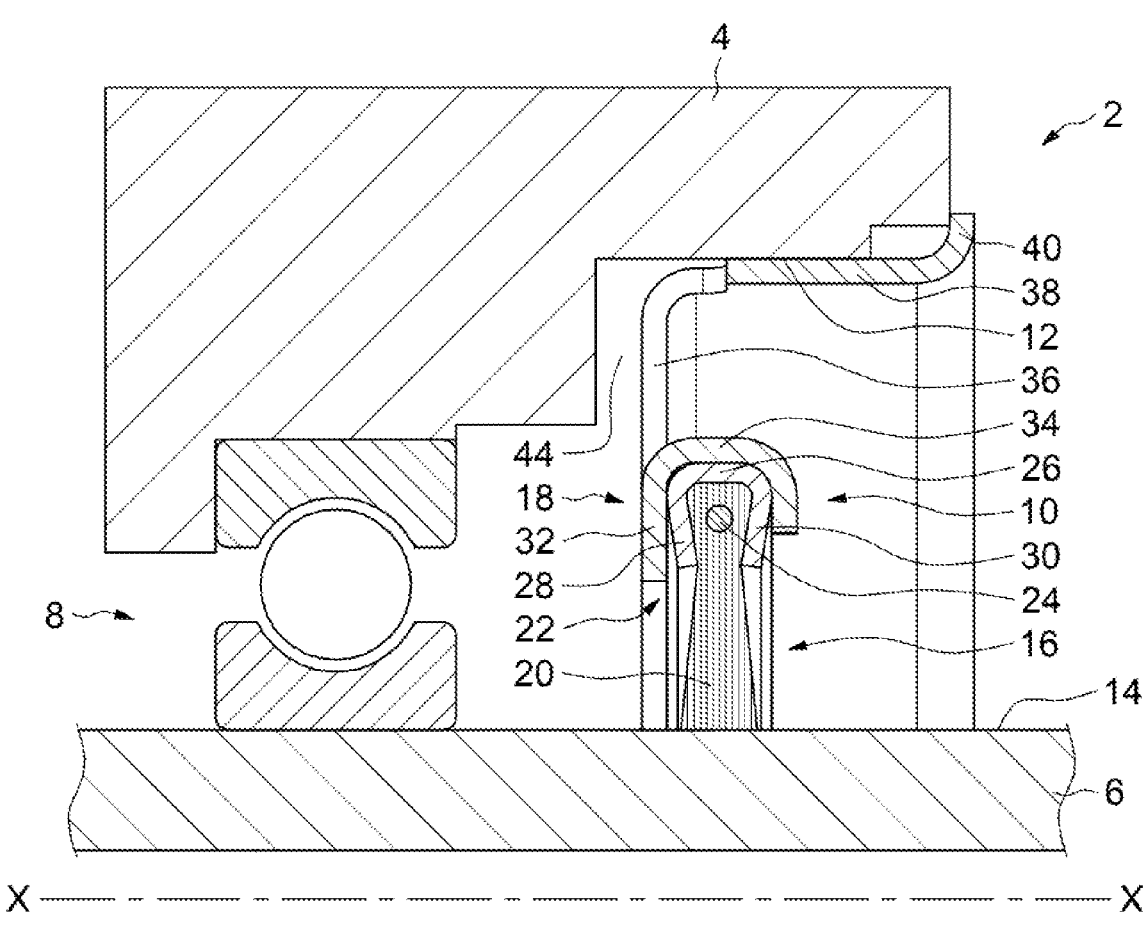
FIG. 6 is an axial cross-sectional view of a second mounting of the assembly of FIG. 1.

FIG. 6 depicts another mounting arrangement of the grounding brush assembly 10 inside the motor 2. In this example, the annular collar 40 of the mounting plate 18 is in axial contact with the casing 4 and the radial portions 36 of the plate 18 are spaced axially from the shoulder of the casing 4. As such, an axial play 44 remains between the radial portions 36 and the casing 4; i.e., an axial clearance 44 is defined between the radial portions 36 and the casing 44.

Similar to the preceding exemplary embodiment, the clearance or axial play 44 enables the insertion of a tool for dismantling or demounting the grounding brush assembly 10, specifically by applying an axial force against the radial portions 36 of the mounting plate 18 and/or against the main body 32 of the mounting plate 18.

Figure 7:
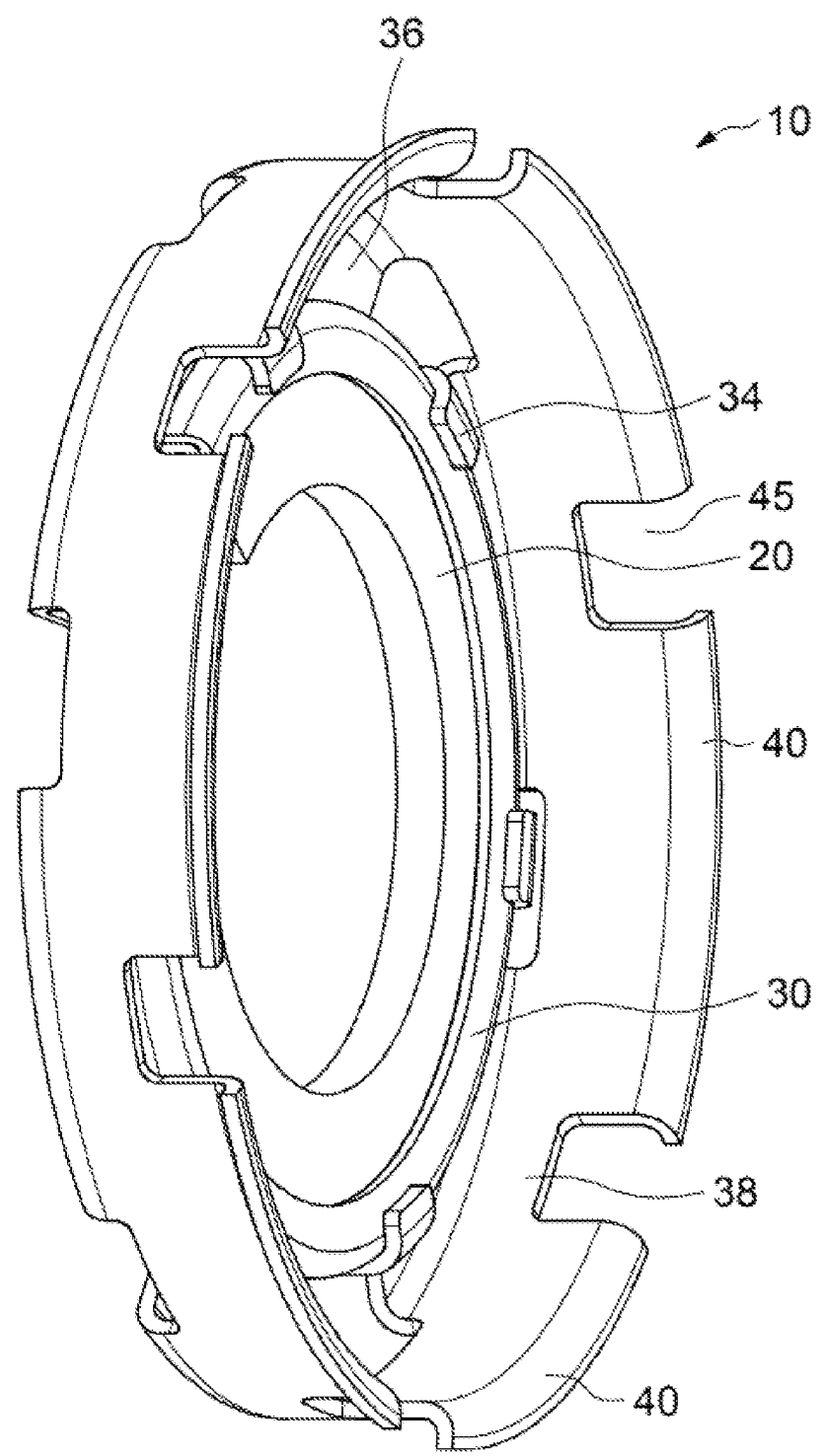
FIG. 7 is a perspective view of a grounding brush assembly according to a second exemplary embodiment of the invention.
Figure 8:
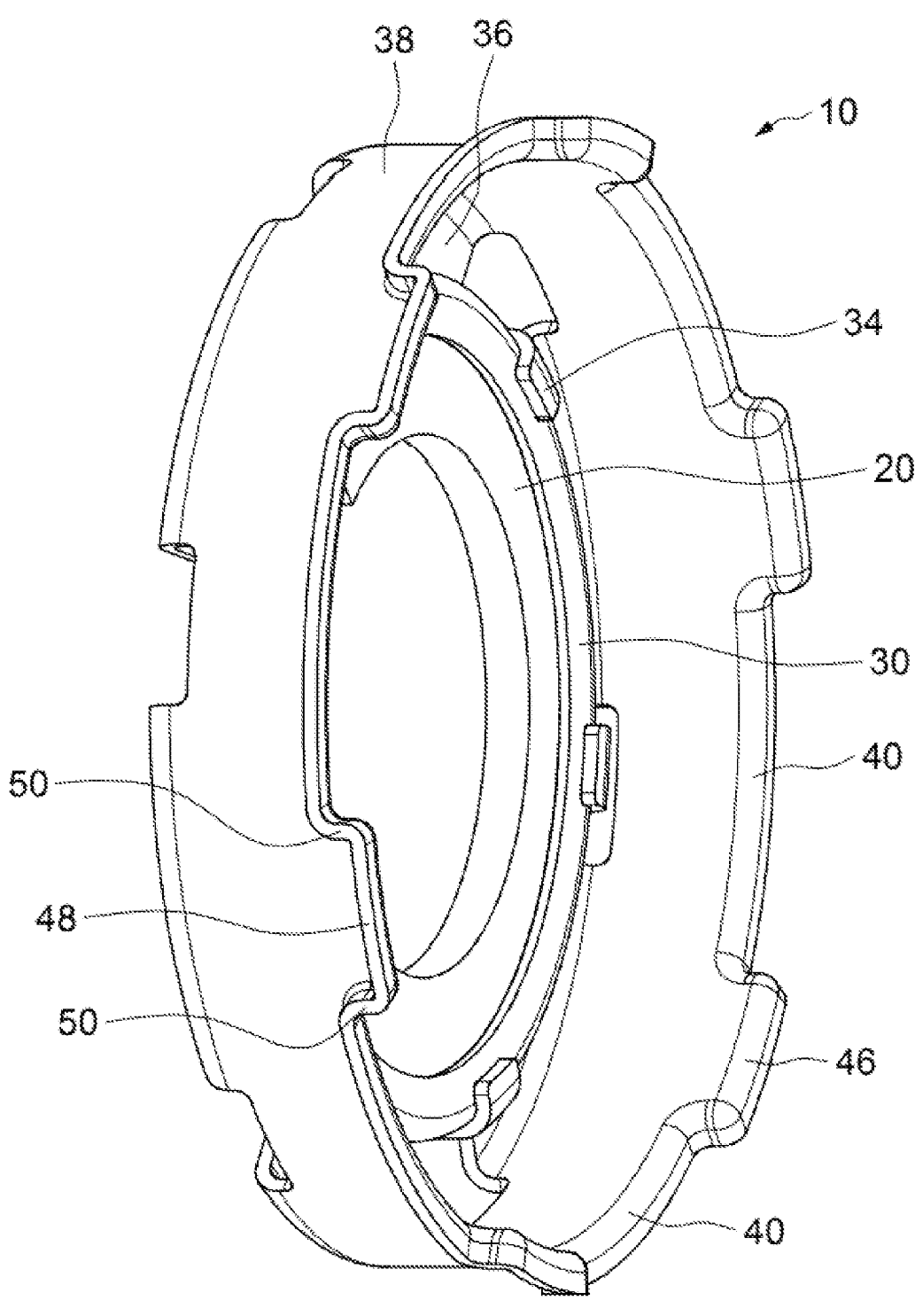
FIG. 8 is a perspective view of a grounding brush assembly according to a third exemplary embodiment of the invention.
Figure 9:
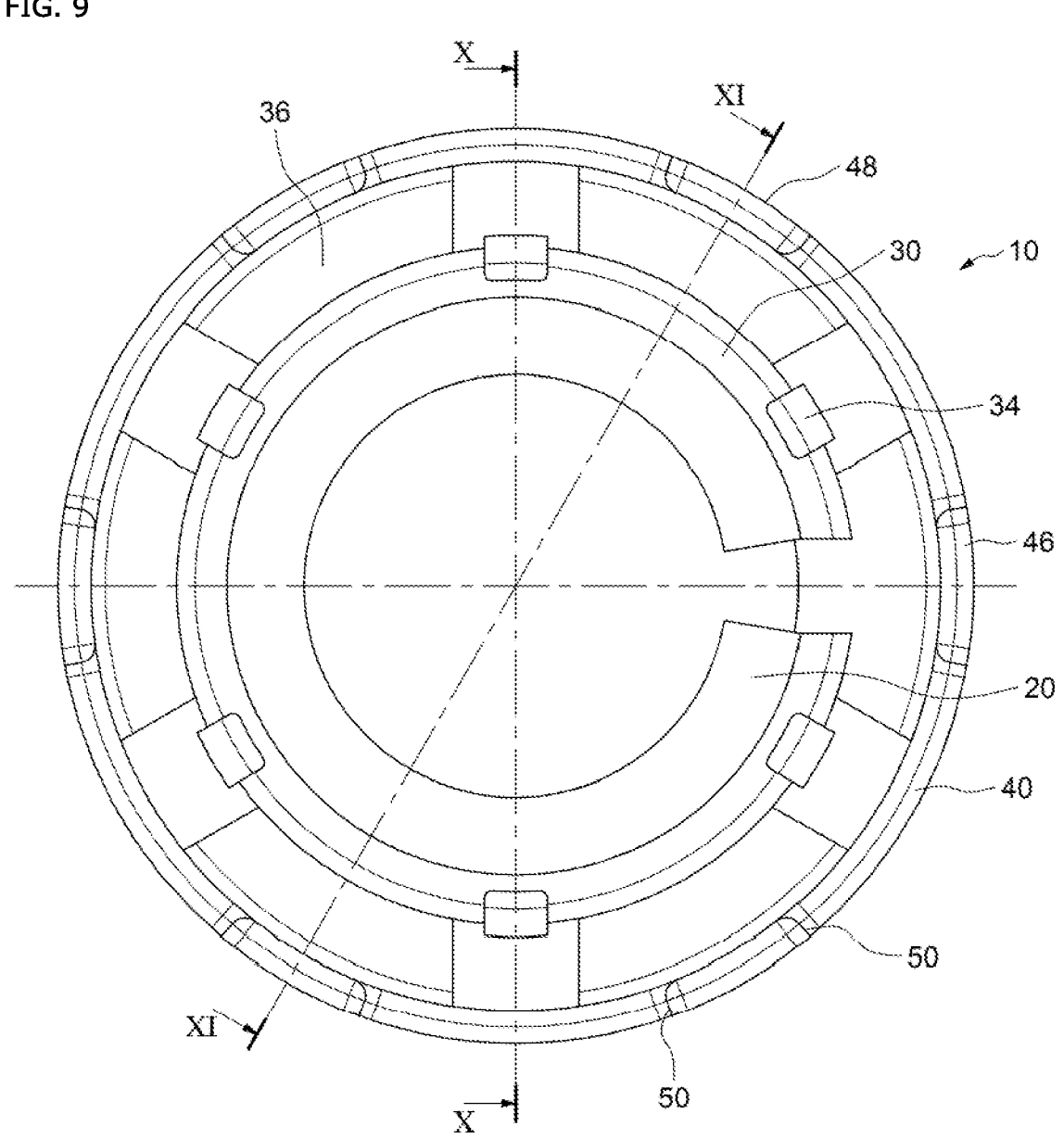
FIG. 9 is a front view of the grounding brush assembly of FIG. 8.

The exemplary embodiment illustrated in FIG. 7, in which the elements that are identical bear the same references, differs from the example illustrated in FIGS. 1-6 in that the mounting plate 18 of the assembly 10 includes a plurality of collars 40 spaced circumferentially apart from each other. A plurality of notches 45 are formed at the distal end of the axial portion 38 to form the plurality of collars 40. In the illustrated exemplary embodiment, the collars 40 are spaced apart regularly or evenly from each other. Alternatively, the collars 40 may be formed so as to be irregularly spaced apart.

The exemplary embodiment illustrated in FIGS. 8-11, in which the elements that are identical bear the same references, differs from the example illustrated in FIGS. 1-6 in that the mounting plate 18 of the grounding brush assembly 10 includes both a plurality of collars 40 spaced circumferentially apart from each other and a plurality of attachment lugs 46 spaced circumferentially apart from each other, each one of the attachment lugs 46 being situated or disposed circumferentially between two successive collars 40; that is, each lug 46 is located between each pair of adjacent collars 40.

The attachment lugs 46 of the mounting plate 18 extend axially from the distal end of the annular axial portion 38 of the mounting plate 18 and are each provided at a distal end with a hook 48 extending radially outwardly. Alternatively, the hooks 48 may extend radially inwardly.

The hooks 48 are offset axially with respect to the collars 40 on the side opposite the plurality of radial portions 36.

In the example represented, each of the attachment lugs 46 of the mounting plate 18 includes two circumferentially opposing rims 50, each rim 50 extending to the hook 48 of the attachment lug 46 and each being connected to a directly adjacent collar 40.

Figure 10:
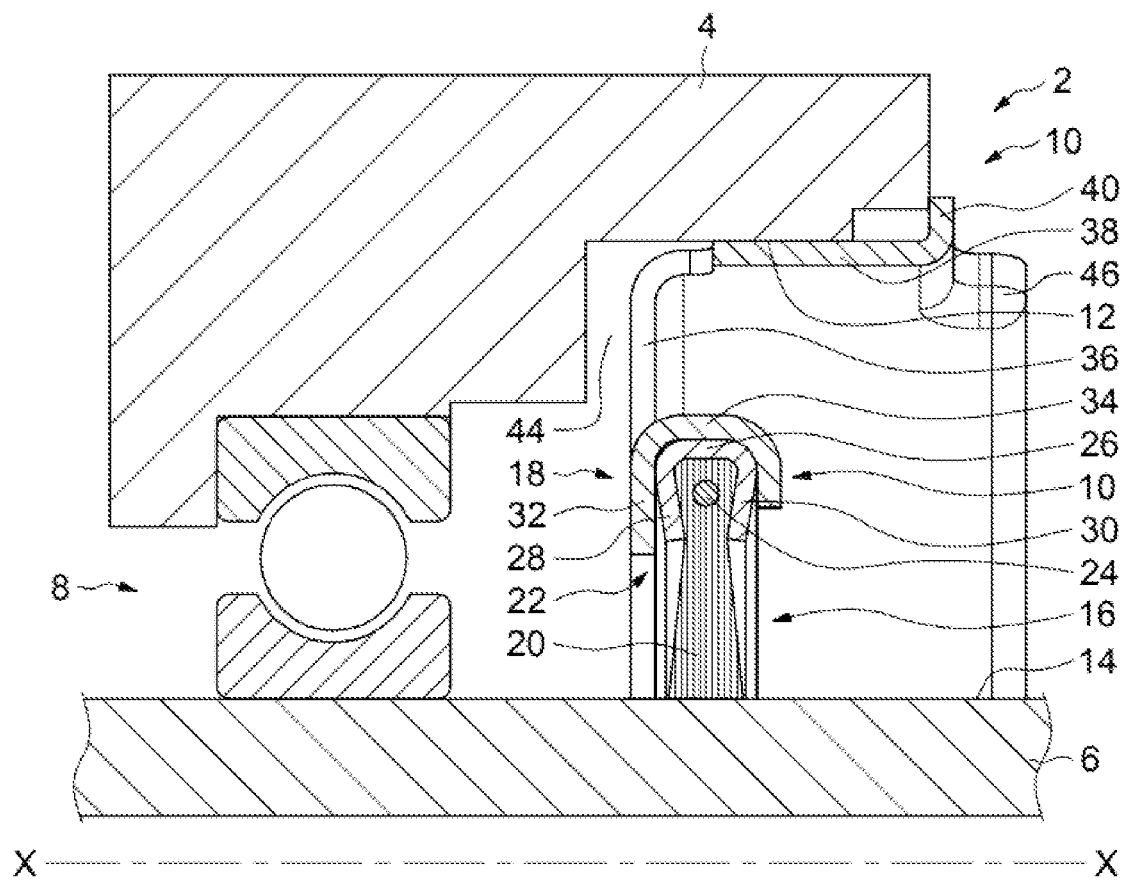
FIG. 10 is a cross-sectional view of the assembly of FIG. 9 along the axis X-X mounted partly radially between the rotary shaft and the casing.
Figure 11:
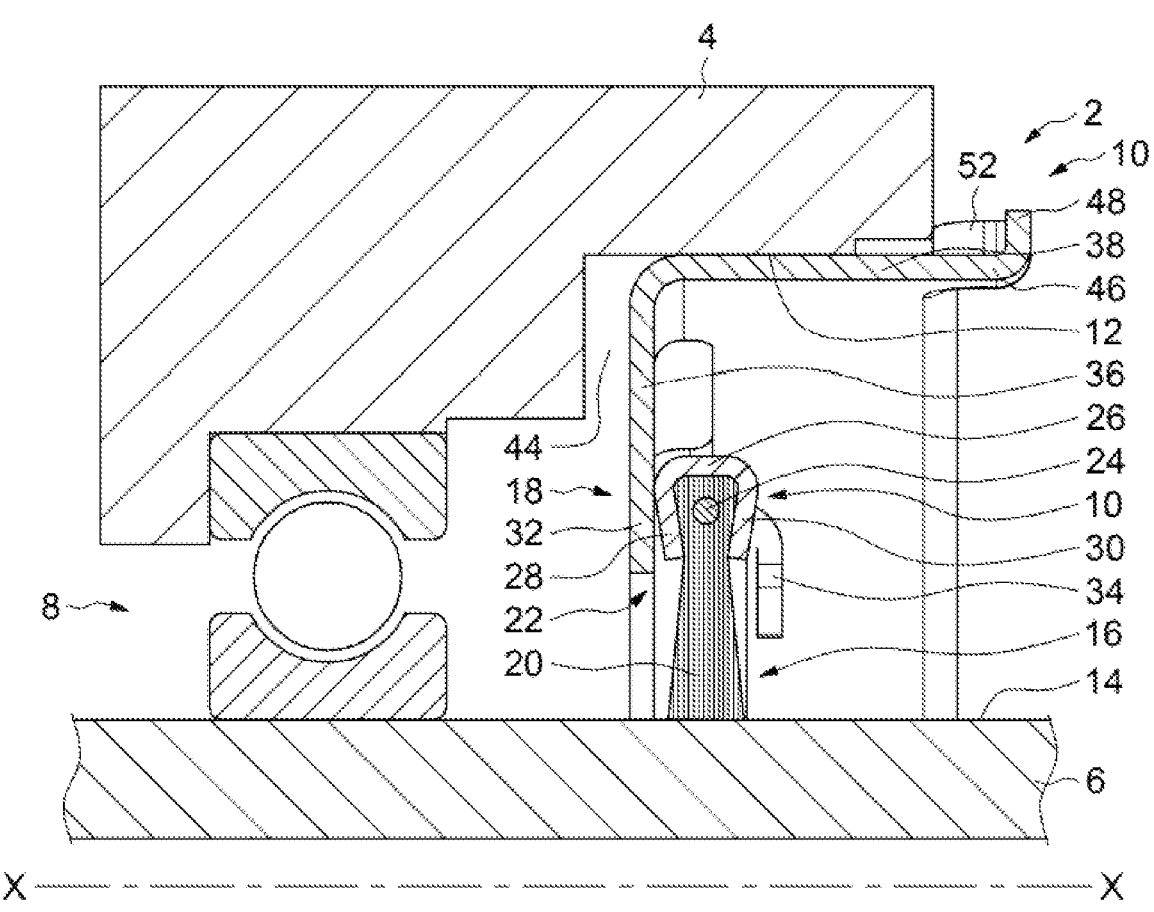
FIG. 11 is a cross-sectional view of the assembly of FIG. 9 along the axis XI-XI mounted partly radially between the rotary shaft and the casing.
Figure 12:
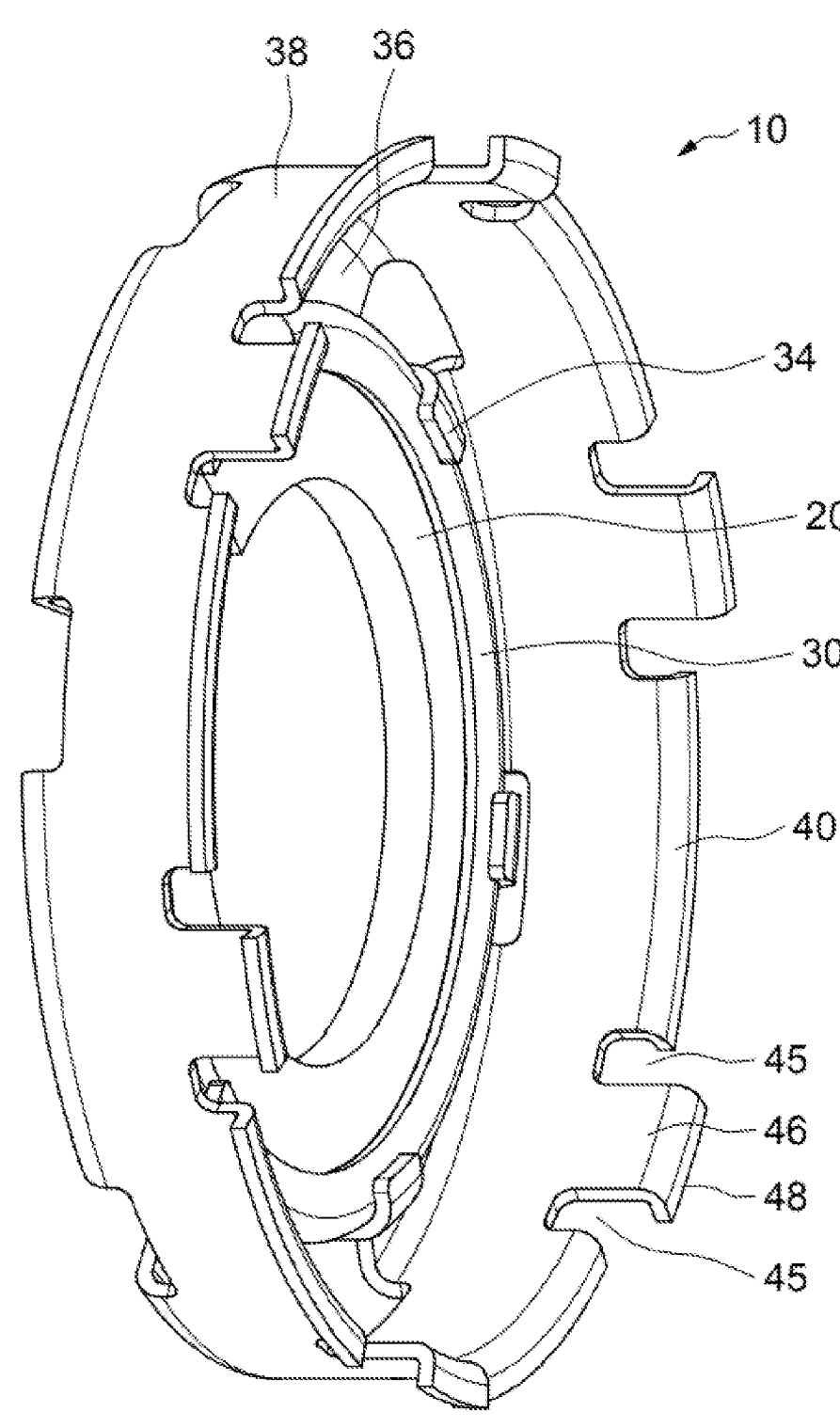
FIG. 12 is a perspective view of a grounding brush assembly according to a fourth exemplary embodiment of the invention.
Figure 13:
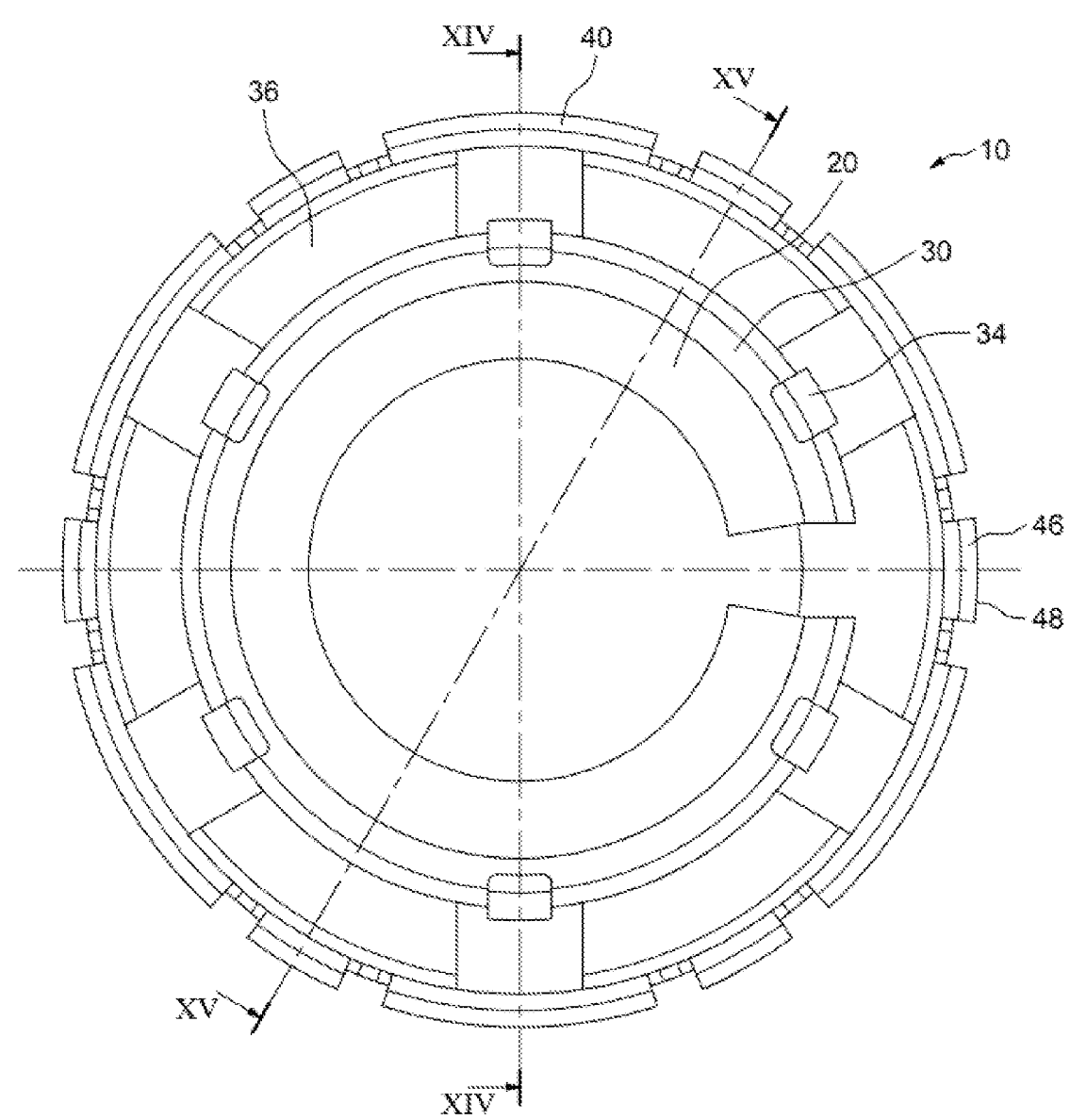
FIG. 13 is a front view of the grounding brush assembly of FIG. 12.
Figure 14:
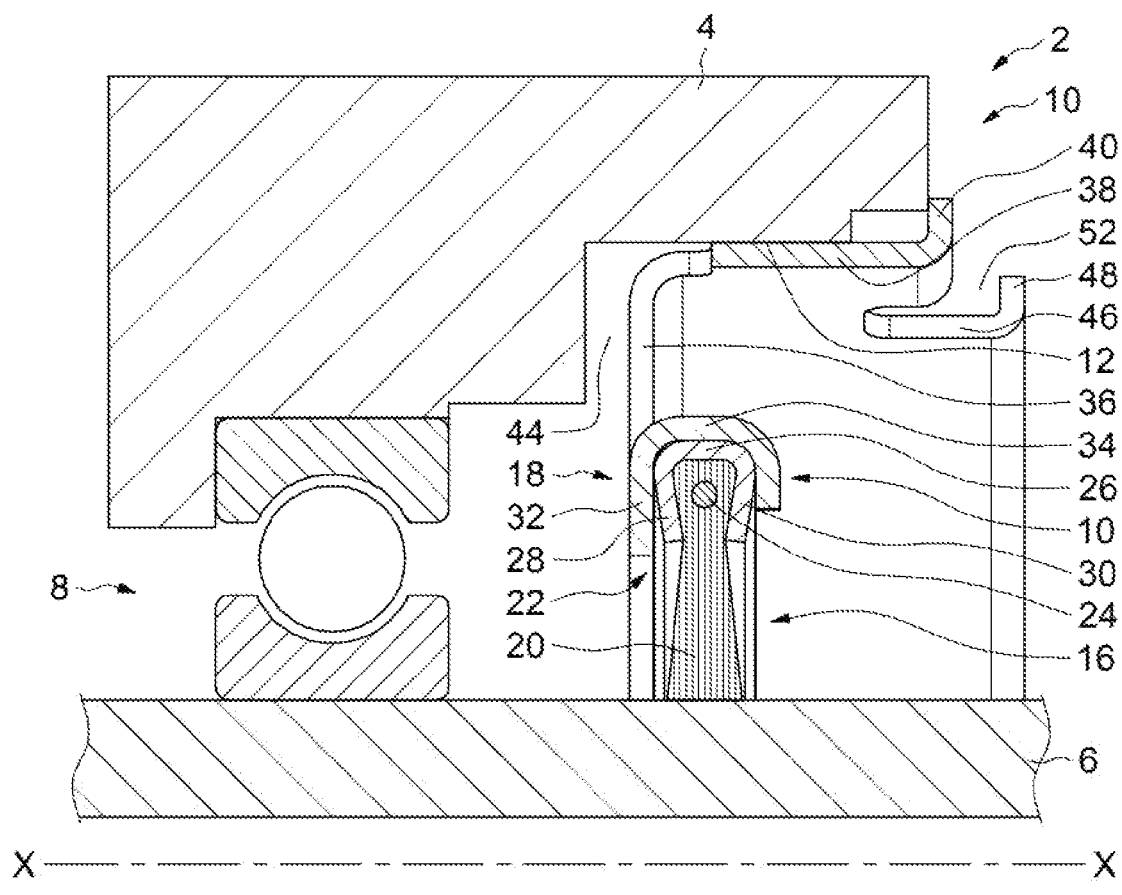
FIG. 14 is a cross-sectional view of the assembly of FIG. 13 along the axis XIV-XIV mounted partly radially between the rotary shaft and the casing.
Figure 15:
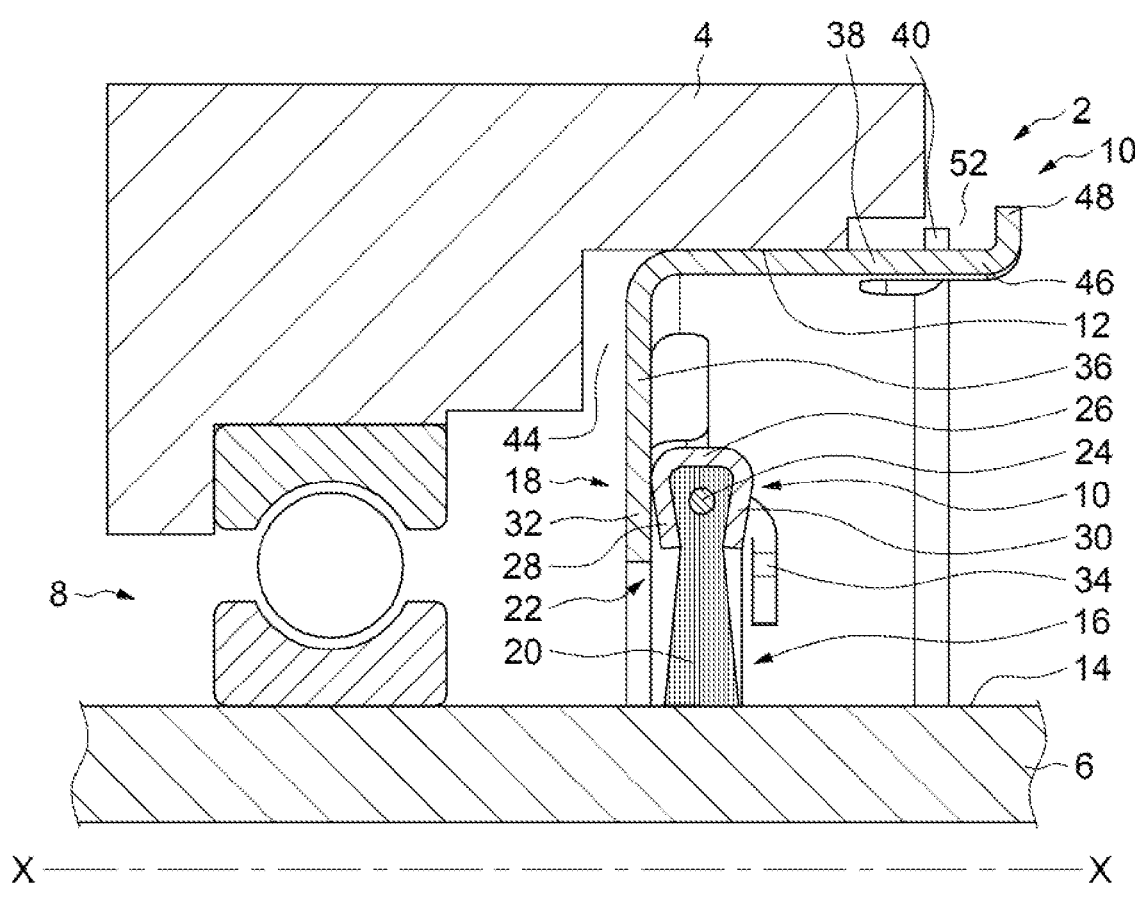
FIG. 15 is a cross-sectional view of the assembly of FIG. 13 along the axis XV-XV mounted partly radially between the rotary shaft and the casing.

FIGS. 10 and 11 depict the grounding brush assembly 10 mounted partly radially between the bore 12 of the casing 4 and the outer cylindrical surface 14 of the shaft 6. The collars 40 of the mounting plate 18 are in axial contact with the casing 4. The attachment lugs 46 extend axially so as to protrude outwardly with respect to the casing 4. Thus, the hooks 48 of the attachment lugs 46 are spaced axially apart from the casing 4. An axial play 52 remains between the hooks 48 and the casing 4; in other words, an axial clearance 52 is defined between the hooks 48 and the casing 4. This axial play or clearance 52 enables the insertion of a tool so that the assembly 10 may be dismantled by pulling axially on the hooks 48.

The exemplary embodiment illustrated in FIGS. 12-15, in which the elements that are identical bear the same references, differs from the example illustrated in FIGS. 8-11 in that the mounting plate 18 does not include the rims 50 and in that a plurality of notches 45 are formed at the distal end of the axial portion 38 such that a circumferential play or a circumferential clearance is formed or defined between each of the attachment lugs 46 and each of the two directly adjacent collars 40. Alternatively, the notches 45 may be formed such that circumferential play or clearance is formed between a part of the attachment lugs 46 and at least one of the two directly adjacent collars 40.

Representative, non-limiting examples of the present invention were described above in detail with reference to the attached drawings. This detailed description is merely intended to teach a person of skill in the art further details for practicing preferred aspects of the present teachings and is not intended to limit the scope of the invention.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter. The invention is not restricted to the above-described embodiments, and may be varied within the scope of the following claims.

What is claimed is:

1. A grounding brush assembly comprising:
   a grounding brush including a support and a plurality of
      conductive fibers housed inside of the support; and
   a brush mounting plate secured to the support and includ-
      ing a radial portion extending radially outwardly with respect to the support, an axial portion extending axially from the radial portion so as to be spaced radially outwardly from and at least partly radially surrounding the support, and at least one collar extending radially outwardly from a distal end of the axial portion;

wherein the mounting plate includes at least one attachment lug extending axially from the axial portion, the at least one attachment lug having a distal end and a hook extending radially from the distal end such that the hook is offset axially with respect to the at least one collar on the side opposite to the radial portion of the mounting plate.

2. The assembly according to claim 1, wherein the collar of the mounting plate is annular.

3. The assembly according to claim 1, wherein the mounting plate includes a plurality of collars spaced circumferentially apart from each other.

4. The assembly according to claim 1, wherein:

the mounting plate includes a plurality of collars spaced circumferentially apart from each other; and the at least one attachment lug of the mounting plate includes two opposing rims each extending from the hook of the attachment lug and each being connected to a directly adjacent collar of the plurality of collars.

5. The assembly according to claim 1, wherein:

the mounting plate includes a plurality of collars spaced circumferentially apart from each other; and a circumferential clearance is defined between the at least one attachment lug of the mounting plate and each directly adjacent collar of the plurality of collars.

6. An electric motor comprising a casing, a shaft and a grounding brush assembly according to claim 1, the grounding brush assembly being mounted radially at least partly between the casing and the shaft and the conductive fibers of the assembly being in contact with the shaft.

7. The motor according to claim 6, wherein an axial clearance is defined between the casing and the at least one collar of the mounting plate.

8. The motor according to claim 6, wherein the mounting plate includes a plurality of radial portions spaced circumferentially apart from each other, an axial clearance being defined between the casing and each one of the plurality of radial portions.

9. The motor according to claim 6, wherein an axial clearance is defined between the casing and the at least one hook.

* * * * *